Oct. 17, 1944.   H. NUTT ET AL   2,360,710
FLUID IMPACT COUPLING COMBINED WITH CLUTCH
Original Filed Jan. 4, 1941
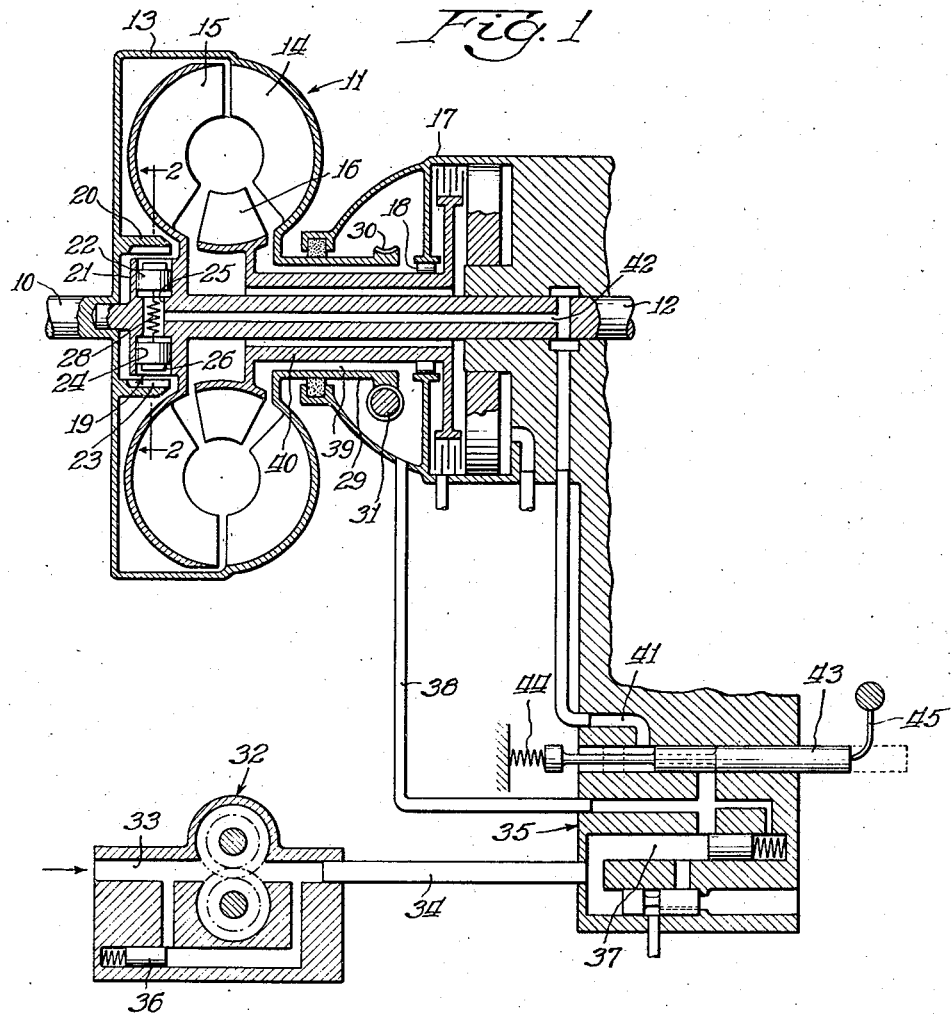
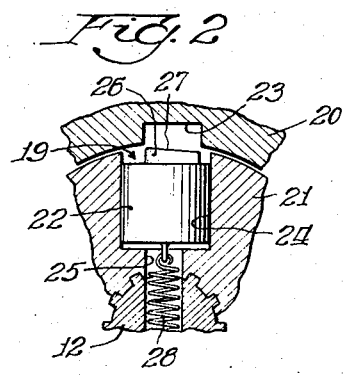
Inventors:
Harold Nutt and
Richard L. Smirl
By Edward C. Fitzhaugh
Atty.

Patented Oct. 17, 1944

2,360,710

UNITED STATES PATENT OFFICE 2,360,710

FLUID IMPACT COUPLING COMBINED WITH CLUTCH

Harold Nutt, Chicago, and Richard L. Smirl, Bellwood, Ill., assignors to Borg-Warner Corporation, Chicago, Ill., a corporation of Illinois Original application January 4, 1941, Serial No. 373,201. Divided and this application March 30, 1942, Serial No. 436,852

16 Claims. (Cl. 192—3.2)

This invention relates to a fluid impact coupling combined with a clutch. This application is a division of our prior application Serial No. 373,201 which was filed January 4, 1941.

The principal object of this invention is to provide a fluid impact coupling such as a hydrodynamic torque converter or coupling with means for mechanically locking the driving and driven members of the coupling together in an improved manner.

A more specific object of this invention is to provide an improved control mechanism for a positive clutch which is to be used to connect the driving and driven elements of a hydrodynamic coupling together for one-to-one drive.

A still more specific object of this invention is to provide a speed responsive positive type clutch for connecting the driving and driven elements of a hydro-dynamic coupling together, the clutch being releasable at the option of the operator by the pressure of the fluid within the coupling.

These and other objects and features of this invention will become apparent from the following detailed description when taken together with the accompanying drawing wherein:

Fig. 1 is a schematic section taken through a hydrodynamic torque converter and its positive lock-up clutch and the fluid circuit therefor; and Fig. 2 is a fragmentary section through the positive clutch taken along line 2—2 of Fig. 1.

In the embodiment of this invention chosen for illustration, a drive shaft 10 is connected at one end to an engine (not shown) and at the other end to a hydrodynamic torque converter 11 which modifies the torque of the engine as it is impressed upon a driven shaft 12. Torque converter 11 is comprised of a housing 13 driven from drive shaft 10 and driving a vaned pump element 14. Hydraulically associated with pump element 14 is a vaned turbine element 15 which is directly connected to driven shaft 12, and a vaned stator element 16 which is connected to a fixed transmission casing 17 through a one-way brake 18. Under normal circumstances the rotation of pump element 14 energizes a fluid which is pumped under pressure into housing 13 and the energized fluid then transmits its energy to turbine element 15 either at increased torque or at the same torque, depending upon whether stator element 16 is stationary or is rotating in the same direction as pump element 14.

Theoretically, when torque converter 11 ceases to convert torque and becomes a hydraulic coupling, a one-to-one drive should exist between drive shaft 10 and driven shaft 12. Practically, however, there is considerable slip between pump element 14 and turbine element 15 so that although no multiplication in torque occurs, the speed ratio between drive shaft 10 and driven shaft 11 is greater than unity. This of course means that the efficiency of the drive is less than 100%, and to increase the efficiency a positive clutch 19 is employed.

Clutch 19 is comprised of an axially extending drum 20 secured to rotate with housing 13 and drive shaft 10, a carrier 21 secured to rotate with driven shaft 12, and one or more pawls 22 slidably mounted in carrier 21 and adapted to couple drum 20 to carrier 21. In the form shown in Fig. 2, drum 20 is provided with a plurality of slots 23 and carrier 21 is provided with radially extending bores 24 with pawls 22 slidably retained in bores 24. Said pawls 22 fit closely in their respective bores 24 so as to function as pistons. A passageway 25 passes directly through shaft 12 and connects opposite bores 24 so that such opposed bores are hydraulically in communication with one another. The outer end 26 of each pawl 22 is formed with a cam surface 27 which serves to eject pawl 22 from slot 23 until drum 20 and carrier 21 are rotating at substantially the same speed.

Pawls 22 are subject to centrifugal force when carrier 21 is rotating and accordingly will normally tend to move radially outwardly so as to effect a connection between carrier 21 and drum 20. This radial outward movement is restrained by a spring 28 which passes through passageway 25 and connects opposite pawls 22 together. Thus spring 28 prevents outward movement of pawls 22 until some predetermined speed of rotation of carrier 21 and its associated shaft 12 is attained. For reasons of economy it is desirable to lock up converter 11 at the earliest possible time and therefore spring 28 is such that it will permit engagement of pawl 22 with slot 23 at speeds wherein torque conversion in converter 11 is still possible. Under certain circumstances, the added torque increase is desirable and if it should be desired after pawls 22 are in engagement with slot 23 some means must be provided for withdrawing the pawls in order to make the torque converter effective. This means will now be described.

It will be observed that a sleeve 29 is secured to pump elements 14 so as to be rotatable therewith. Said sleeve drives a pair of gears 30, 31 which in turn drive a pump 32. Said pump draws fluid from the sump of the transmission (not shown) at the inlet side 33 of the pump and transmits the fluid under pressure through a conduit 34 to a valve block 35. The pressure in conduit 34 is regulated by means of a pressure regulating valve 36 which by-passes the fluid back into intake passageway 33 when the fluid pressure becomes too high. Conduit 34 connects with a conduit 37 in valve block 35 which in turn connects with a conduit 38 leading into the transmission casing 17 and thence through an opening 39 between stator support 40 and sleeve 29 into housing 13. Fluid under pressure is also conducted from passageway 37 through a branch conduit 41 and a connecting conduit 42 in shaft 12 to passageway 25. The passage of fluid into conduit 41 is controlled by means of a valve 43 which is normally biased to open position by a spring 44 and may be moved to a closed position as shown in Fig. 1 by means of a lever 45 controlled by the operator. When valve 43 is in the position shown, passageway 41 is vented to the left (Fig. 1) of valve block 35 so that pressure in conduit 41 and connecting conduit 42 is removed completely.

It will be observed that conduit 38 supplies fluid pressure to housing 13 and that this pressure is communicated to the outer surface of each pawl 22. Fluid under the same pressure, however, is conducted through conduits 41 and 42 and connecting passageway 25 to the opposite sides of pawls 22 thereby effecting a balanced condition on both sides of the pawl and rendering the pawl free from the effects of fluid pressure. Thus as long as the pressure on both sides of the pawls is balanced they are subject only to centrifugal force as modified by spring 26.

The pressure within the housing remains constant so long as drive shaft 10 is rotating, but the pressure on the inside of the pawls 22 may be controlled by valve 43. Assuming that clutch 19 is engaged and that the operator wishes to disengage the clutch so as to drive through the converter 11, all that he need do is to rotate lever 45 clockwise as viewed in Fig. 1, thereby moving pawl 43 to the position shown and venting passageway 41. The pressure on the inside of pawls 22 immediately drops to zero and the previously balanced condition of the pawl becomes unbalanced in favor of retracting pawls 22. The pressure of the fluid within housing 13 therefore acts upon the outside of pawls 22 and, assisted by spring 26, forces pawls 22 radially inwardly to a released position. It is contemplated of course that torque shall be removed from clutch 19 at the time conduit 41 is vented as described in the above mentioned prior application. It is further contemplated that above the speed at which torque converter 11 is no longer effective to convert torque the pressure within housing 13 will be insufficient to overcome the centrifugal force developed in the pawls and the pawls therefore will not be retracted.

It is understood that the foregoing description is merely illustrative of a preferred embodiment of the invention and that the scope of the invention therefore is not to be limited thereto but is to be determined by the appended claims. Thus it is immaterial insofar as this invention is concerned whether the pawls move radially, axially or obliquely, and it is likewise immaterial whether the piston portion acts directly upon the pawl or upon a pressure plate of a friction clutch.

We claim:

1. A torque transmitting mechanism comprising drive and driven elements, a source of fluid under pressure, fluid operated means for transmitting torque between the elements, additional means controlled by the speed of one of said elements for transmitting torque between said elements, said additional means having a surface exposed to the fluid under pressure, and means for substantially balancing the pressure exerted by the fluid to permit the speed controlled means to become effective.

2. A torque transmitting mechanism comprising drive and driven elements, a source of fluid under pressure, fluid operated means for transmitting torque between the elements, additional means controlled by the speed of one of said elements for transmitting torque between said elements, said additional means being biased to disengaged position by the fluid under pressure, and means opposing the bias to permit the speed control to become effective.

3. A torque transmitting mechanism comprising drive and driven elements, a source of fluid under pressure, fluid operated means for transmitting torque between the elements, a clutch for connecting said elements to bypass the fluid operated means, means for operating said clutch and being speed-responsive to engage the clutch, said last named means including a piston connected with the clutch and having one side exposed to the fluid under pressure, and means for balancing at least a portion of the pressure exerted upon the piston to permit the clutch to be operated in response to speed.

4. A torque transmitting mechanism comprising drive and driven elements, a source of fluid under pressure, fluid operated means for transmitting torque between the elements, additional means controlled by the speed of one of said elements for transmitting torque between said elements, said additional means having a surface exposed to the fluid under pressure, and manually operated means for selectively balancing the pressure exerted by the fluid on said surface to permit said additional means to be speed controlled or for removing the balancing pressure to establish an unbalanced condition in favor of disconnecting said additional means over a predetermined range of speeds of said one of said elements.

5. A torque transmitting mechanism comprising drive and driven elements, a source of fluid under pressure, a rotatable chamber normally filled with fluid under pressure, means connecting the chamber with the driving element, pump vanes in said chamber, a vaned rotor connected to the driven element and coupled to the pump vanes through the fluid, a clutch for coupling the pump vanes and rotor independently of the fluid, means for operating said clutch and being speed-responsive to engage the clutch, said last named means including differential operating means for the clutch having one surface exposed to the pressure within the chamber whereby to bias the clutch to inoperative position and means for substantially balancing the pressure to permit the clutch to be operated in response to speed.

6. A torque transmitting device comprising drive and driven elements, a source of fluid under pressure, fluid operated means for transmitting torque between the elements, a clutch for transmitting torque between said elements, said clutch having a surface exposed to the fluid under pressure so as to be biased to disengaged position, and means for overcoming the disengaging bias to engage the clutch.

7. A torque transmitting device comprising drive and driven elements, a source of fluid under pressure, fluid operated means for transmitting torque between the elements, a clutch for transmitting torque between said elements, said clutch having a surface exposed to the fluid under pressure so as to be biased to disengaged position, and means controlled by the speed of one of the elements for overcoming the disengaging bias to engage the clutch.

8. A torque transmitting device as in claim 7, and manually operated over-control means for rendering the speed-controlled means ineffective after said speed-controlled means has become operative to engage the clutch, whereby to disengage the clutch.

9. A torque transmitting device comprising drive and driven elements, a source of fluid under pressure, a rotatable housing normally filled with fluid under pressure, means connecting the housing with the driving element, a vaned pump element in said housing, aid driven thereby, a vaned rotor connected to the driven element and coupled to the pump element through the fluid, a clutch for coupling the pump and rotor independently of the fluid, pressure differential operating means for the clutch having one surface exposed to the pressure within the chamber, whereby to supply releasing pressure for the clutch, and means controlled by the speed of one of the first mentioned elements for engaging the clutch.

10. A torque-transmitting device comprising drive and driven elements, a source of fluid under pressure, fluid-operated means for transmitting torque between the elements, a clutch for transmitting torque between said elements, said clutch comprising a slotted member on the drive element, substantially radial bores in the driven element, pistons in the bores, said pistons having extensions engageable with the slots, a conduit connecting said bores, said extensions being exposed to the fluid under pressure so as to be biased to disengaged position, and means for establishing sufficiently great pressure in the connecting conduit substantially to balance the disengaging bias and condition the clutch for engagement.

11. A torque-transmitting device comprising drive and driven elements, a source of fluid under pressure, fluid-operated means for transmitting torque between the elements, a clutch for transmitting torque between said elements, said clutch comprising a slotted member on the drive element, substantially radial bores in the driven element, pistons in the bores, said pistons having extensions engageable with the slots, a conduit connecting said bores, resilient means in tension in the bores connecting the pistons to retract said pistons, said extensions being exposed to the fluid under pressure so as to be biased in disengaged position, and means for establishing sufficiently great pressure in the connecting conduit substantially to balance the disengaging bias to condition the clutch for engagement.

12. A torque-transmitting device comprising drive and driven elements, a container, means for supplying fluid under pressure to the container, a vaned driving element in the container and connected to the drive element, a cooperating vaned rotor likewise in the container and connected to the driven element, said vaned element and rotor comprising fluid-operated means for transmitting torque between the drive and driven elements, a clutch for transmitting torque between said elements, said clutch comprising a slotted member on the drive element, substantially radial bores in the driven element, said radial bores communicating with the fluid under pressure in the container, pistons in the bores, said pistons having extensions engageable with the slots, a conduit connecting said bores, said extensions being exposed to the fluid under pressure so as to be biased to disengaged position, and means for admitting fluid from the source supplying the container to the inner ends of the pistons substantially to balance the disengaging bias and condition the clutch for engagement.

13. A torque-transmitting device as described in claim 12, said source of fluid under pressure for the container comprising a reservoir of fluid, a pump for withdrawing fluid from the reservoir and creating a pressure in the withdrawn fluid, a conduit leading from the pump to the container and a second conduit leading from the pump to the means for establishing sufficiently great pressure in the connecting conduit substantially to balance the disengaging bias.

14. A torque transmitting mechanism comprising drive and driven elements, a source of fluid under pressure, a hydrodynamic coupling device connected with said source of fluid and transmitting torque between said drive and driven elements, a clutch for completing a power train between said drive and driven elements independently of said hydrodynamic device, means for operating said clutch and comprising a piston disposed in a substantially radially extending bore in one of said elements whereby the piston is movable outwardly under centrifugal force for engaging said clutch, the outer end of said piston being exposed to the fluid under pressure in said hydrodynamic device so as to be biased to clutch disengaging position, and means for providing a pressure on the inner end of said piston for substantially balancing the pressure on its outer end to permit the piston to move outwardly under centrifugal force for engaging the clutch.

15. A torque transmitting mechanism comprising drive and driven elements, a source of fluid under pressure, a hydrodynamic coupling device for transmitting torque between the elements and comprising a fluid chamber connected with said source of fluid, a clutch for transmitting torque between said elements, means for operating said clutch comprising a plurality of pistons disposed in substantially radial bores in said driven element and movable outwardly under centrifugal force to engage the clutch, said pistons being disposed with their outer ends exposed to the fluid under pressure in said chamber so as to be biased to clutch disengaging position, and means for establishing sufficiently great pressure on the inner ends of said pistons to substantially balance the disengaging bias whereby the pistons may act under centrifugal force to engage the clutch.

16. A torque transmitting mechanism comprising drive and driven elements; a source of fluid under pressure; a hydrodynamic coupling device for transmitting torque between the elements and comprising a fluid chamber connected with said source of fluid; a clutch for transmitting torque between said elements; means for engaging said clutch and comprising a pair of pistons disposed in substantially radial, oppositely extending bores in said driven element whereby the pistons are movable outwardly under centrifugal force to engage the clutch; a conduit connecting both bores, resilient means in tension in the bores connecting said pistons to retract the pistons; the outer ends of said pistons being in communication with said chamber and thereby being exposed to the fluid under pressure therein so as to be biased to clutch disengaging position; and means including a valve for admitting fluid from said fluid pressure source to said bores and the inner ends of said pistons to substantially balance the pressure on the outer ends of the piston whereby the pistons may move under centrifug force to clutch engaging position.

HAROLD NUTT.
RICHARD L. SMIRL